United States Patent
Fujikawa et al.

(10) Patent No.: US 7,744,954 B2
(45) Date of Patent: Jun. 29, 2010

(54) METHOD OF PRODUCING A POWDER, POWDER, AND MULTILAYERED CERAMIC CAPACITOR USING THE SAME

(75) Inventors: Yoshinori Fujikawa, Tokyo (JP); Satoko Ueda, Tokyo (JP); Kouji Tokita, Tokyo (JP)

(73) Assignee: TDK Corporation, Tokyo (JP)

( * ) Notice: Subject to any disclaimer, the term of this patent is extended or adjusted under 35 U.S.C. 154(b) by 900 days.

(21) Appl. No.: 11/384,508

(22) Filed: Mar. 21, 2006

(65) Prior Publication Data
US 2006/0216512 A1 Sep. 28, 2006

(30) Foreign Application Priority Data
Mar. 22, 2005 (JP) .............................. 2005-082642
Feb. 13, 2006 (JP) .............................. 2006-035263

(51) Int. Cl.
*B05D 7/00* (2006.01)
(52) U.S. Cl. ......................................... 427/212; 75/343
(58) Field of Classification Search .................. 427/212
See application file for complete search history.

(56) References Cited

U.S. PATENT DOCUMENTS 4,832,939 A * 5/1989 Menashi et al. ............. 423/598
6,548,437 B2 * 4/2003 Sato et al. .................... 501/139
2002/0016249 A1 2/2002 Saito et al.

FOREIGN PATENT DOCUMENTS

| CN | 1331476 A | 1/2002 |
| JP | 10-310469 | 11/1998 |

OTHER PUBLICATIONS

"Barium Titanate Ceramics", In Dictionary of Chemical Technology, Chemical Industry Press, 4th Edition, Aug. 2000, p. 900.

* cited by examiner

*Primary Examiner*—Michael Cleveland
*Assistant Examiner*—Robert Vetere
(74) *Attorney, Agent, or Firm*—Oblon, Spivak, McClelland, Maier & Neustadt, L.L.P.

(57) ABSTRACT

A core/shell structured powder different in composition between the inside the particle and the surface thereof before sintering, so that it is possible to sinter the powder at lower temperature and give a core/shell structured powder having a shell portion uniform in thickness after sintering; a multilayered ceramic capacitor having a longer lifetime, by preparing the multilayered ceramic capacitor by using a powder having a core/shell structure different in composition between the inside the particle and the surface thereof before sintering; and a method of producing a powder by synthesizing particles in the liquid containing a raw material, wherein particles different in composition at least between the inside the particle and the surface thereof are obtained by adding a composition to be incorporated as a component of the particles to the liquid during the synthetic process so that the composition of the liquid changes continuously or intermittently.

7 Claims, 4 Drawing Sheets

METHOD OF PRODUCING A POWDER, POWDER, AND MULTILAYERED CERAMIC CAPACITOR USING THE SAME

BACKGROUND OF THE INVENTION

1. Field of the Invention

The present invention relates to a method of producing a powder, the powder and a multilayered ceramic capacitor using the same.

2. Description of the Related Art

Recently, improvement in performance and miniaturization of electronic devices is rapidly advanced, along with the progress of electronic parts such as IC and LSI. In accordance therewith, improvement in performance and reduction in size in capacitors, being an electronic part, and there exists a rapidly increasing demand for multilayered ceramic capacitors. For example, what terminal electrodes is formed on a capacitor element consisting of dielectric layers and internal electrodes alternately laminated is known as such a multilayered ceramic capacitor. Along with the demand for improvement in performance and miniaturization of the multilayered ceramic capacitors, there is a demand for improvement in electrical characteristics of its dielectric material, i.e., dielectric powder such as barium titanate.

The dielectric layer of a multilayered ceramic capacitor is required to satisfy, for example, a requirement for X7R specified in the standards of the U.S. Electronic Industries Association (EIA Standard) that the capacity temperature change rate in a temperature range of −55° C. to 125° C. should be within ±15% from that at a standard temperature of 25° C. For satisfying the requirement for X7R, proposed is a method of preparing particles of a dielectric powder having a core/shell structure. The core/shell structure is a structure of particle having a core portion inside the particle and a shell portion covering the core portion. For example, an additive containing various additional components such as magnesium and yttrium is added to the barium titanate powder and the resulting mixture is sintered, for forming the core/shell structure. In such a case, the particle contains pure barium titanate as a composition of the core portion and a solid solution of barium titanate and magnesium or yttrium as a composition of the shell portion. Presence of a shell portion of a dielectric material containing additional components as a shell portion reduces the fluctuation in specific dielectric constant in the temperature range at which the multilayered ceramic capacitor or the like is used, and allow production of a multilayered ceramic capacitor having an extended lifetime. Accordingly, there exists a need for particles different in composition between the inside the particle and the surface thereof, like those having a core/shell structure.

However, when a capacitor is sintered using a dielectric powder prepared by conventional methods, a solid solution of magnesium or yttrium added as the shell component becomes uneven in many cases and consequently generating heterogeneous phases in the composition after sintering. In addition, when a multilayered ceramic capacitor is prepared, excessive additional components, which are not sufficiently incorporated into the solid solution with the principal component, remained on the grain boundary, are reacted with the internal electrodes and therefore caused a problem of short circuiting of the internal electrodes.

To overcome such a problem, methods of producing a dielectric powder having a core/shell structure using a solid-phase method are disclosed (e.g., Japanese Patent Application Laid-Open (JP-A) No. 10-310469).

SUMMARY OF THE INVENTION

However, sintering at a high temperature of 1,000° C. or higher is needed to obtain a dielectric powder by the solid-phase method. An excessively higher sintering temperature causes problems of deterioration in the uniformity of particles and increase in particle diameter, consequently demanding precise adjustment of the sintering temperature. The solid-phase method also results occasionally in insufficient dispersion of the additional components and thus, gives capacitors unfavorable in properties because of uneven thickness of the shell portion.

Thus, an object of the present invention is to previously form a core/shell structured powder different in composition between the inside the particle and the surface thereof before sintering the powder, so that it is possible to sinter the powder at lower temperature and give a core/shell structured powder having a shell portion uniform in thickness after sintering. Another object of the present invention is to provide a multilayered ceramic capacitor having a longer lifetime, by preparing the multilayered ceramic capacitor by using a powder having a core/shell structure different in composition between the inside the particle and the surface thereof before sintering.

The method of producing a powder according to the invention, which is aimed at solving the problem above, is a method of producing a powder by synthesizing particles in a liquid containing raw materials of two or more elements, wherein particles different in composition at least between the inside the particle and the surface thereof are obtained by supplying a composition to be incorporated as a component of the particles to the liquid during the synthetic process so that the composition of the liquid changes continuously or intermittently.

In a feature of the method of producing a powder according to the invention, the liquid contains raw materials of two or more elements and the composition contains a raw materials of one or more elements, or the liquid contains a raw materials of one or more elements and the composition contains raw materials of two or more elements before initiation of synthesis, and the ratio of the elements contained in the composition or the feed rate of the composition is changed during supply of the composition to the liquid. By supplying the composition in this manner, it is possible to obtain particles having a gradient of the composition of part of the elements in the direction from the inside to the surface of particle.

In another feature of the method of producing a powder according to the invention, the liquid contains raw materials of two or more elements and the composition contains a raw materials of one or more elements before initiation of synthesis, and the ratio of the elements contained in the composition is kept constant during supply of the composition to the liquid. By supplying the composition in this manner, it is possible to obtain particles having compositions different from each other in the core portion and the shell portion.

In yet another feature of the method of producing a powder according to the invention, the composition is the principal component, the additional component, or both of the principal and additional components for the particles, and the particle obtained are particles different in the composition of the principal component between the inside the particle and the surface thereof, particles different in the composition of the additional component between the inside the particle and the surface thereof, or particles different in the composition of both of the principal and additional components between the inside the particle and the surface thereof. As described above, it is possible to obtain particles having a core/shell structure of various modes, by changing the principal component, the additional component, or both of the principal and additional components during the synthetic process for the particles.

In addition, in the method of producing a powder according to the invention, the particles obtained are preferably an oxide having a perovskite structure. Use of oxide forming a perovskite structure is effective in providing the resulting powder with the properties as a ferroelectric material and in preparing a powder favorable for production of multilayered ceramic capacitors and the like.

In yet another feature of the method of producing a powder according to the invention, the oxide having a perovskite structure is an oxide represented by $ABO_3$, wherein A is at least one element selected from the group A consisting of barium, strontium, lead, rare-earth metals, magnesium, potassium, and sodium, and B is at least one element selected from the group B consisting of titanium, zirconium, and niobium.

In yet another feature of the method of producing a powder according to the invention, the liquid contains at least a raw material containing group-A element A1 and a raw material containing group-B element B1, and the composition contains a raw material containing another group-A element A2 different from the A1 element before initiation of synthesis; and the particles having a composition of $A1B1O_3$ containing the A1 and B1 elements as the principal components inside the particle and a composition of $A2B1O_3$ containing the A2 and B1 elements as the principal components in the surface of the particle are obtained by supplying the composition to the liquid during the synthetic process.

In yet another feature of the method of producing a powder according to the invention, the liquid contains at least a raw material containing group-A element A1 and a raw material containing group-B element B1, and the composition contains a raw material containing another group-A element A2 different from the A1 element before initiation of synthesis; and the particles having a composition of $A1B1O_3$ containing the A1 and B1 elements as the principal components, a composition containing the A2 element as the additional component which substitutes for part of the A1 element, and a composition wherein the content ratio of the A2 element is different between the inside the particle and the surface thereof are obtained, by supplying the composition to the liquid during the synthetic process while the feed rate of the raw material containing an A2 element is changed.

In yet another feature of the method of producing a powder according to the invention, the liquid contains at least a raw material containing group-A element A1 and a raw material containing group-B element B1, and the composition contains a first composition containing a raw material containing another group-A element A2 different from the A1 element and a second composition containing a raw material containing another group-A element A3 different from both the A1 and A2 elements before initiation of synthesis; and the particles having a composition of $A1B1O_3$ containing the A1 and B1 elements as the principal components inside the particle, a composition of $A2B1O_3$ containing the A2 and B1 elements as the principal components in the surface of the particle, a composition containing the A3 element which substitutes for part of the A1 or A2 element as the additional component, and a composition wherein the content ratio of the A3 is different between the inside the particle and the surface thereof are obtained, by supplying the first composition to the liquid and additionally supplying the second composition to the liquid while the feed rate of the raw material containing an A3 element is changed during the synthetic process.

In yet another feature of the method of producing a powder according to the invention, the liquid contains at least a raw material containing the group-B element B1, and the composition include a first composition containing a raw material containing the group-A element A1 and a second composition containing a raw material containing another group-A element A2 different from the A1 element before initiation of synthesis; and the particles having a composition of $A1B1O_3$ containing the A1 and B1 elements as the principal components inside the particle and a composition of $A2B1O_3$ containing the A2 and B1 elements as the principal components in the surface of the particle are obtained, by supplying the first composition to the liquid and the second composition thereto after an elapse of a predetermined period the liquid during the synthetic process.

In yet another feature of the method of producing a powder according to the invention, the liquid contains at least a raw material containing group-B element B1 before initiation of synthesis; the composition includes a first composition containing a raw material containing the group-A element A1 and a second composition containing a raw material containing another group-A element A2 different from the A1 element; and the particles having a composition of $A1B1O_3$ containing the A1 and B1 elements as the principal components, a composition containing the A2 element as the additional component which substitutes for part of the A1 element, and a composition wherein the content ratio of the A2 element is different between the inside the particle and the surface thereof are obtained, by supplying the first composition to the liquid and then the second composition to the liquid while the feed rate of the raw material containing an A2 element is changed during the synthetic process.

In yet another feature of the method of producing a powder according to the invention, the liquid contains at least a raw material containing group-B element B1, and the composition includes a first composition containing a raw material containing the group-A element A1, a second composition containing a raw material containing another group-A element A2 different from the A1 element, and a third composition containing a raw material containing another group-A element A3 different from both of the A1 and A2 elements before initiation of synthesis; and the particles having a composition of $A1B1O_3$ containing the A1 and B1 elements as the principal components inside the particle, a composition of $A2B1O_3$ containing the A2 and B1 elements as the principal components in the surface of the particle, a composition containing the A3 element as the additional component which substitutes for part of the A1 or A2 element, and a composition wherein the content ratio of the A3 is different between the inside the particle and the surface thereof are obtained, by supplying the first composition to the liquid, then the third composition to the liquid while the feed rate of the raw material containing an A3 element is changed, and then the second composition to the liquid after an elapse of a predetermined period during the synthetic process.

In the method of producing a powder according to the invention, the particles are preferably synthesized in hydrothermal reaction. By employing a hydrothermal synthesis method as the method of producing a powder, it becomes possible to synthesize particles at a low temperature of 1,000° C. or lower and obtain core/shell-structured particles having a shell portion uniform in thickness before sintering of the powder.

In yet another feature of the method of producing a powder according to the invention, the particles are preferably synthesized in an alkaline solution at 80° C. or higher. By using a hydrothermal synthesis method as the method of producing a powder, it becomes possible to synthesize particles at a low temperature of 80° C. or higher.

The powder according to the invention is a powder synthesized in a liquid containing raw materials of two or more elements, wherein particles are different in composition at least between the inside the particle and the surface thereof that are prepared by supplying a composition to be incorporated as a component of the particles to the liquid so that the composition of the liquid changes continuously or intermittently during the synthetic process.

The powder according to the invention is a powder of an oxide having a perovskite structure, including particles different in composition between the inside the particle and the surface thereof, wherein the weight loss rate of the oxide powder, which is determined by thermogravimetric analysis in a temperature range of 200° C. to 700° C., is 0.1 wt % or more and 2.0 wt % or less, or the rate of particles having empty pores inside in the oxide powder, which is determined by observation under a transmission electron microscope, is 0.5% or more.

In yet another embodiment of the powder according to the invention, the particles are particles different in the composition of the principal component between the inside the particle and the surface thereof, particles different in the composition of the additional component between the inside the particle and the surface thereof, or particles different in the composition of both of the principal and additional components between the inside the particle and the surface thereof. As described above, among particles having the core/shell structure of various modes, it is possible to obtain a powder of which each of the particle has a shell portion uniform in thickness that gives flattened temperature coefficient of capacitance when a multilayered ceramic capacitor is formed therewith.

The multilayered ceramic capacitor according to the invention includes a dielectric layer formed by sintering a dielectric material containing the powder described above.

EFFECT OF THE INVENTION

In the present invention, by previously forming a core/shell structure different in composition between the inside the particle and the surface thereof before sintering the powder, it is possible to sinter it at lower temperature and obtain a core/shell structured powder having a shell portion uniform in thickness after sintering. It is also possible to provide a multilayered ceramic capacitor having a longer lifetime, by preparing the multilayered ceramic capacitor by using a core/shell structured powder different in composition between the inside the particle and the surface thereof before sintering.

BRIEF DESCRIPTION OF THE DRAWINGS

FIG. 4 is a photography showing the results of observation of a dielectric powder having a core/shell structure prepared by the production method according to the invention.

EXPLANATION OF REFERENCES

Figure 1:
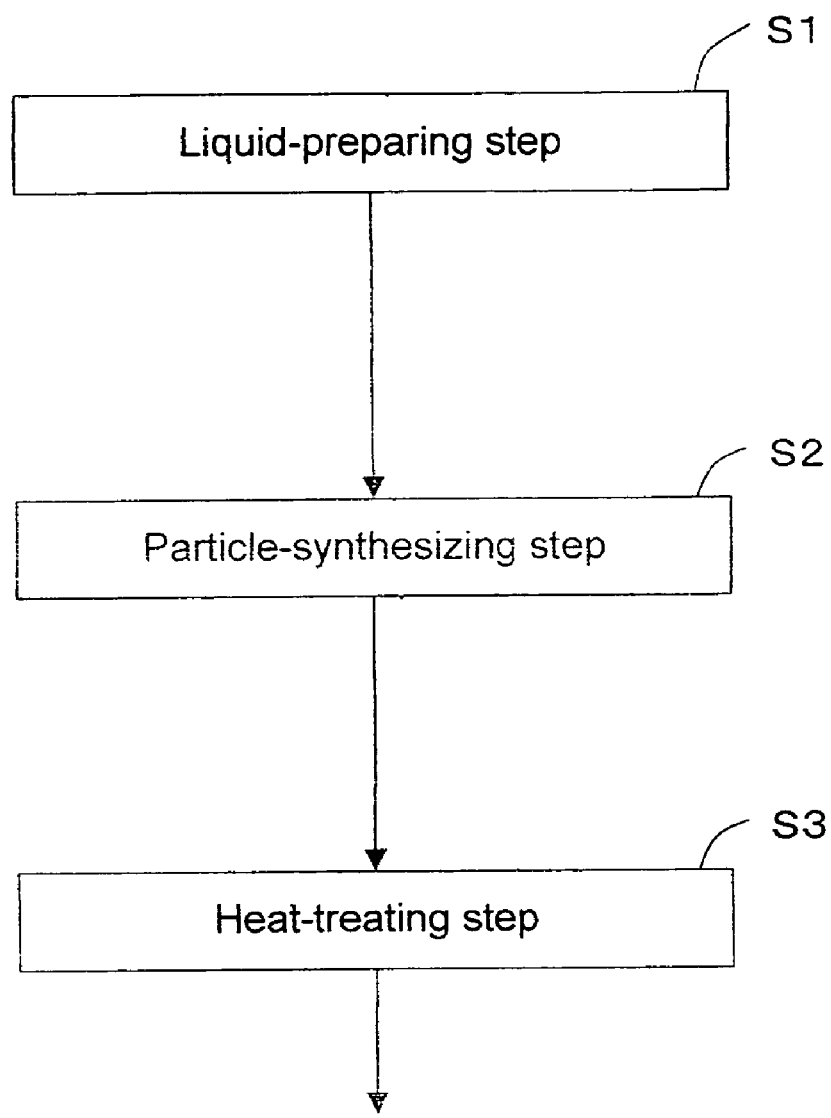
FIG. 1 is a flow chart showing the method of producing a powder in an embodiment.

1, Reaction chamber
2, Heater
3, Metering pump
4, Safety valve
5, Temperature sensor
6, Casing
7, Liquid containing raw materials
8, Additional component and others
9, Inlet
12, Top cap
13, Internal space
20, Hydrothermal reactor
21, First particle structure
22, Core portion
23, Shell portion
24, Second particle structure
25, Particle
26, Direction
27, Third particle structure
28, Core portion
29, Shell portion
30, Direction
31, Fourth particle structure
32, Core portion
33 and 34, Shell portion

DESCRIPTION OF THE PREFERRED EMBODIMENTS

Hereinafter, the present invention will be described in detail with reference to embodiments, but it should be understood that the invention is not limited to the embodiments. Hereinafter, the method of producing a powder, the powder thereof, and the multilayered ceramic capacitor containing the same in the present embodiment will be described with reference to FIGS. 1 to 3.

The method of producing a powder and the powder thereof according to the present invention will be described along the flow of the method of producing a powder. A step of producing a multilayered ceramic capacitor with the powder will be then described.

In the method of producing a powder of the present embodiment by synthesizing particles in a liquid containing raw materials of two or more elements to be component of the particles, the method of producing a powder, particles different in composition at least between the inside the particle and the surface thereof are obtained by supplying a composition to be incorporated as a component of the particles to the liquid so that the composition of the liquid changes continuously or intermittently during the synthetic process. Such particles are obtained, for example, when the liquid contains raw materials of two or more elements and the composition contains a raw materials of one or more elements, or the liquid contains a raw materials of one or more elements and the composition contains raw materials of two or more elements before initiation of synthesis; and the ratio of the elements contained in the composition or the feed rate of the composition is changed during supply of the composition to the liquid; or alternatively, when the liquid contains raw materials of two or more elements and, the composition contains a raw materials of one or more elements before initiation of synthesis; and the ratio of the elements contained in the composition is kept constant during supply of the composition to the liquid.

As shown in FIG. 1, the method of producing a powder in the present embodiment includes a step of preparing a liquid containing raw materials (step S1) and a particle-synthesizing step of synthesizing particles in the liquid containing raw materials (step S2). The particle-synthesizing step (step S2) is not particularly limited, if it is a step of synthesizing particles in the liquid containing raw materials, but a hydrothermal synthesis method of synthesizing particles by hydrothermal reaction is favorable. Hereinafter, the particle-synthesizing step (step S2) will be described, taking the hydrothermal synthesis method as an example. The method of producing a powder in the present embodiment may include a Heat-treating step (step S3) additionally.

The liquid-preparing step (step S1) will be described first. Examples of the powders prepared by the method of producing a powder in the present embodiment include powders for use as a dielectric material in electronic parts such as multilayered ceramic capacitor. Examples of the dielectric materials include ferroelectric materials having a perovskite structure such as BST (($Ba_xSr_{1-x}$)$TiO_3$), $BaTiO_3$, ($Ba_xCa_{1-x}$)$TiO_3$, $PbTiO_3$, and $Pb(Zr_xTi_{1-x})_3$; composite perovskite-relaxer ferroelectric materials such as $Pb(Mg_{1/3}Ni_{2/3})O_3$; bismuth layered compounds such as $Bi_4Ti_3O_{12}$ and $SrBi_2Ta_2O_9$; ferroelectric tungsten bronze materials such as ($Sr_xBa_{1-x}$)$Nb_2O_6$ and $PbNb_2O_6$; and the like. Among them, ferroelectric materials having a perovskite structure ($ABO_3$ structure) such as BST, $BaTiO_3$ (barium titanate), and PZT are higher in dielectric constant and thus used favorably. The powder prepared by the method of producing a powder in the present embodiment will be described hereinafter, by using barium titanate powder as an example for simplicity of description, but the embodiment is not limited to barium titanate. Thus, A in $ABO_3$ may be at least one element selected from the group A consisting of barium, strontium, lead, rare-earth metals, magnesium, potassium, and sodium. B may be at least one element selected from the group B consisting of titanium, zirconium, and niobium. Examples of the rare-earth metals include yttrium, dysprosium, and holmium.

Examples of the raw titanium-source raw materials for the dielectric barium titanate powder include titanium element-containing compounds such as titanium oxide powder, titanium alkoxides, titanium tetrachloride, and the hydrolysates thereof. When the powder obtained by the present invention is used in electronic parts such as multilayered ceramic capacitor, the powder is preferably chlorine-free titanium oxide powder or titanium alkoxide, and cheaper titanium oxide powder is particularly preferable.

Examples of the barium salts used as the raw barium-source material for the barium titanate powder include barium hydroxide anhydride, barium hydroxide dihydrate, barium hydroxide octahydrate, barium chloride, barium chloride dihydrate, barium nitrate, and barium carboxylates (examples of the carboxylic acid including formic acid, acetic acid, propionic acid, butyric acid, isobutyric acid, valeric acid, iso-valeric acid, pivalic acid, caproic acid, caprylic acid, capric acid, lauric acid, myristic acid, palmitic acid, stearic acid, oxalic acid, malonic acid, succinic acid, glutaric acid, adipic acid, pimelic acid, suberic acid, azelaic acid, sebacic acid, acrylic acid, propiolic acid, methacrylic acid, crotonic acid, isocrotonic acid, oleic acid, fumaric acid, maleic acid, benzoic acid, toluic acid, naphthoic acid, phthalic acid, isophthalic acid, terephthalic acid, cinnamic acid, furancarboxylic acid, thiophenecarboxylic acid, nicotinic acid, and isonicotinic acid). Among them, barium hydroxide anhydride, barium hydroxide dihydrate, and barium hydroxide octahydrate are preferable, because they do not contain impurities such as chloride ion.

When the dielectric material prepared is strontium titanate, examples of the raw strontium-source materials include the following strontium salts: strontium hydroxide, strontium hydroxide octahydrate, strontium chloride monohydrate, strontium chloride dihydrate, strontium chloride hexahydrate, strontium nitrate, and strontium carboxylates (the carboxylic acids are the same as those above). Among them, strontium hydroxide and strontium hydroxide octahydrate are preferable, because they do not contain impurities such as chloride ion.

In the liquid-preparing step (step S1), an alkaline compound may be added to the liquid containing raw materials, for acceleration of the hydrothermal reaction. In such a case, it is preferable to make the alkaline solution, by adding the alkaline compound so that the liquid containing raw materials is adjusted to a pH of 12 or more. Examples of the alkaline compounds include sodium hydroxide, potassium hydroxide, and aqueous ammonia.

In addition, water or an organic solvent may be added to the liquid containing raw materials to perform the hydrothermal reaction in the liquid-preparing step (step S1). Examples of the organic solvents include $C_1$ to $C_8$ alkanols, preferably $C_1$ to $C_4$ alkanols, such as methanol, ethanol, n-propanol, isopropanol, n-butanol, isobutanol, sec-butanol and tert-butanol, and acetone; and particularly preferable is at least one solvent selected from the group consisting of methanol, ethanol, propanol, and acetone. When the dielectric material is barium titanate, use of an organic solvent prevents contamination of hydroxyl group in the hydrothermally synthesized powder of barium titanate and reduces the numbers of barium defects in barium titanate and of empty holes in the barium titanate powder after heat treatment.

The particle-synthesizing step (step S2) of synthesizing particles by using the liquid containing raw materials prepared in the liquid-preparing step (step S1) will be described below. In the present embodiment, a hydrothermal synthesis method allowing synthesis of particles in the liquid at lower temperature is described as an example.

The hydrothermal synthesis temperature by the hydrothermal synthesis method is 80° C. or higher and preferably 150° C. or higher and 500° C. or lower. For example, barium titanate powder can be synthesized in such a low temperature range. As a result, it is possible to produce core/shell structured particles having a shell portion uniform in thickness, without distribution of the elements in the added components uniformly into the particles and making the entire particles a shell portion, during synthesis of the powder by a solid-phase method.

A hydrothermal synthesis temperature of lower than 80° C. leads to generation of foreign matters other than the hydrothermally synthesized powder. For example, titanium oxide powder and barium hydroxide octahydrate are hydrothermally synthesized at a temperature of lower than 80° C., generation of barium titanate is observed, when the dry powder obtained by filtering the slurry of the reaction product obtained by the hydrothermal synthesis and drying the cake is analyzed by X-ray diffraction. However it also shows presence of unreacted titanium oxide and barium carbonate generated by decomposition of barium hydroxide. On the other hand, in hydrothermal synthesis at a temperature of 80° C. or higher a hydrothermally powder of impurity-free highly crystalline cubic barium titanate is obtained. In addition, it is preferable to cause the hydrothermal reaction under the condition at a high temperature of 150° C. or higher and a high pressure, for improvement in crystallinity. At a temperature of higher than 500° C., the hydrothermal reactor is required to have a higher withstanding pressure, and thus, inevitably becomes larger in size.

In the particle-synthesizing step (step S2), a composition to be incorporated as a component of the particles is added to the liquid containing raw materials, so that the composition of the liquid containing raw materials change continuously or intermittently during the synthetic process.

The composition to be incorporated as a component of the particles is the principal component, the additional component for the particles, or both of the principal and additional components. For example, when the particles prepared is those of an oxide having a perovskite structure, the principal component for particles is an element entering into the A or B site of the perovskite structure. In the present embodiment, addition of a composition containing an element entering into the A site to the liquid containing raw materials will be described mainly.

The additional component is a component added for improvement in the properties of capacitor, and it is added in a trace amount, for example, for flattening of the fluctuation in specific dielectric constant in the temperature range in which multilayered ceramic capacitors and others are used. The additional component is preferably a compound containing a element in the group A such as magnesium or yttrium salt; and magnesium acetate and yttrium acetate are favorable. A dysprosium or holmium salt may also be used.

The composition of the liquid containing raw materials is changed continuously or intermittently for forming particles having a core/shell structure. It is a process of the raw materials being gradually consumed along the progress of the particle synthesis, and does not mean a state where the composition is constant in the entire reaction system, but a state where the composition is gradually changing in the entire system. By adding the composition described above continuously over time or intermittently after an elapse of a predetermined period, it is possible to change the composition of the liquid containing raw materials in the entire reaction system and to obtain particles having a core/shell structure. Continuous addition may be performed linearly or exponentially over time. Intermittent addition may be performed only once or multiple times. Alternatively, the continuous and intermittent additions may be used in combination. The component may be added simultaneously with initiation of the particle synthesis or gradually during the particle synthesis. Alternatively, the component may be added after synthesis of particles, and particle synthesis may be repeated once again together with the added composition.

In the method of producing a powder in the present embodiment, the composition is supplied by the procedures for preparation of the particle will be described below. Six kinds of procedures will be shown below:

(Supply Procedure 1)

Before initiation of synthesis, at least a raw material containing group-A element A1 and a raw material containing group-B element B1 are added to a liquid, giving a liquid containing raw materials. A composition containing a raw material containing another group-A element A2 different from the A1 element is prepared. The composition is supplied to the liquid containing raw materials in the synthetic process. In this manner, obtained are particles having a composition of $A1B1O_3$ containing A1 and B1 elements as the principal components inside the particle and having a composition of $A2B1O_3$ containing A2 and B1 elements as the principal components in the surface of the particle.

(Supply Procedure 2)

Before initiation of synthesis, at least a raw material containing group-A element A1 and a raw material containing group-B element B1 are added previously to a liquid, giving a liquid containing raw materials. A composition containing a raw material containing another group-A element A2 different from the A1 element is prepared. The composition is supplied to the liquid containing raw materials in the synthetic process, while the feed rate of the raw material containing an A2 element is changed. In this manner, obtained are particles having a composition of $A1B1O_3$ containing A1 and B1 elements as the principal components, and containing an A2 element as the additional component which substitutes for part of the A1 element, and wherein the content ratios of the A2 element are different between the inside the particle and the surface of particle.

(Supply Procedure 3)

Before initiation of synthesis, at least a raw material containing group-A element A1 and a raw material containing group-B element B1 are added previously to a liquid, as a liquid containing raw materials. A composition consists of a first composition containing a raw material containing another group-A element A2 different from the A1 element and a second composition containing a raw material containing another group-A element A3 different from both the A1 and A2 elements is prepared. The first composition is supplied to the liquid containing raw materials and the second the composition is supplied to the liquid containing raw materials in the synthetic process while the feed rate of the raw material containing an A3 element is changed. In this manner, obtained are particles having a composition of $A1B1O_3$ containing A1 and B1 elements as the principal components inside the particle, a composition of $A2B1O_3$ containing A2 and B1 elements as the principal components in the surface of the particle, a composition containing an A3 element as the additional component which substituents for part of the A1 or A2, and a composition wherein the content ratios of the A3 element are different between the inside the particle and the surface of particle.

(Supply Procedure 4)

Before initiation of synthesis, at least a raw material containing group-B element B1 is added previously to a liquid, as a liquid containing raw materials. A composition consists of a first composition containing a raw material containing group-A element A1 and a second composition containing a raw material containing another group-A element A2 different from the A1 element. The first composition is supplied to the liquid containing raw materials, and the second composition is supplied to the liquid containing raw materials after an elapse of a predetermined period in the synthetic process. In this manner, obtained are particles having a composition of $A1B1O_3$ containing A1 and B1 elements as the principal components inside the particle and a composition of $A2B1O_3$ containing A2 and B1 elements as the principal components in the surface of the particle.

(Supply Procedure 5)

Before initiation of synthesis, at least a raw material containing group-B element B1 is added previously to a liquid, giving a liquid containing raw materials. A composition including a first composition containing a raw material containing a group-A element A1 and a second composition containing a raw material containing another group-A element A2 different from the A1 element is prepared. The first composition is supplied to the liquid containing raw materials, and then, the second the composition is supplied to the liquid containing raw materials in the synthetic process, while the feed rate of the raw material containing an A2 element is changed. In this manner, obtained are particles having a composition of $A1B1O_3$ containing A1 and B1 elements as the principal components, containing an A2 element as the additional component which substitutes for part of the A1 element, and having the content ratios of the A2 element are different between the inside the particle and the surface of particle.

(Supply Procedure 6)

Before initiation of synthesis, at least a raw material containing group-B element B1 is added previously to a liquid containing raw materials. A composition consists of a first composition containing a raw material containing group-A element A1, a second composition containing a raw material containing another group-A element A2 different from the A1 element, and a third composition containing a raw material containing another group-A element A3 different from both the A1 and A2 elements. The first composition is supplied to the liquid containing raw materials, and then, the third composition is supplied to the liquid containing raw materials while the feed rate of the raw material containing an A3 element is changed, and the second composition is supplied to the liquid containing raw materials after an elapse of a predetermined period during synthetic process. In this manner, obtained are particles having a composition of $A1B1O_3$ containing A1 and B1 elements as the principal components inside the particle, a composition of $A2B1O_3$ containing A2 and B1 elements as the principal components in the surface of the particle, a composition containing an A3 element an the additional component which substitutes for part of the A1 or A2 elements, and a composition wherein the content ratios of the A3 element are different between the inside the particle and the surface of particle.

Figure 2:
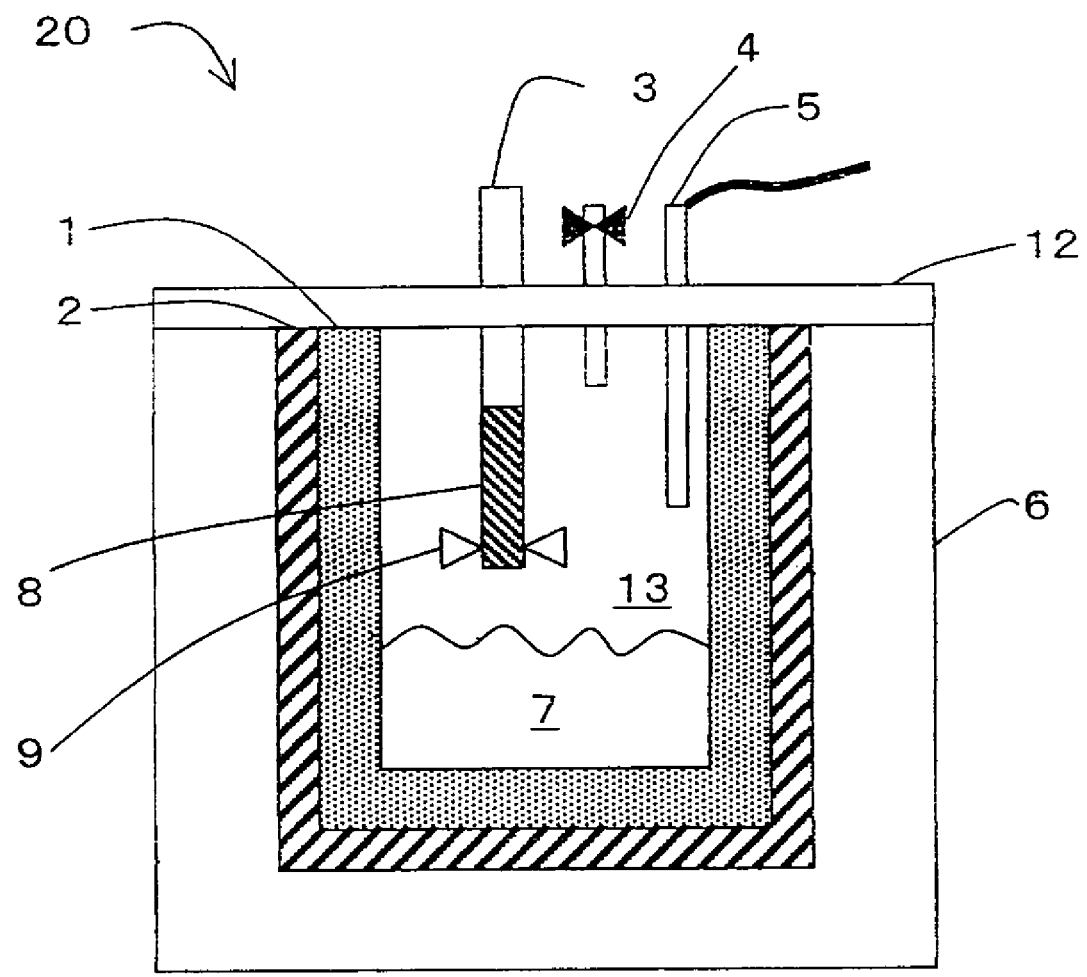
FIG. 2 is a schematic view illustrating a hydrothermal reactor used in the embodiment.

Hereinafter, the apparatus for synthesizing particles in the particle-synthesizing step (step S2) described above will be described. The hydrothermal reactor 20 shown in FIG. 2 is used for hydrothermal synthesis in the particle-synthesizing step (step S2). The hydrothermal reactor 20 includes a reaction chamber 1, a heater 2, a metering pump 3, a safety valve 4, a temperature sensor 5, and a casing 6 storing and supporting these units inside.

The reaction chamber 1 stores a liquid containing raw materials 7 in its internal space 13. The reaction chamber 1, which is a pressure vessel demanding strength, is made of stainless steel, a hastelloy alloy, or the like. An electric heater, electric furnace, circulation heater (steam, oil, water) or the like is used as the heater 2. The temperature sensor 5 used is a thermocouple compatible with the temperature condition of hydrothermal reaction. The safety valve 4 used is a lift or rupture-disk safety valve.

The metering pump 3 contains a principal component, an additional component, or both the principal and additional component (hereinafter, jointly referred to as an "additional component and others 8") inside. An inlet 9 for supplying the additional component and others 8 is made at the bottom terminal of the metering pump 3. The inlet 9 has on-off plate (not shown).

An example of the procedure for making particles hydrothermal reaction by using the hydrothermal reactor 20 will be described below. A liquid containing raw materials 7 is placed in the internal space 13 of the reaction chamber 1, and the reaction chamber 1 is sealed with a top cap 12. Then, the liquid is heated with a heater 2, synthesizing particles by hydrothermal reaction. The temperature of the internal space 13 is monitored with a temperature sensor 5 and adjusted with the heater 2. The pressure of the internal space 13 is regulated by the temperature of internal space 13. After initiation of synthesizing, the opening and closing plate (not shown) is made open after an elapse of a predetermined period in the synthetic process, and an additional component and others 8 are fed into the liquid containing raw materials 7 through the inlet 9. Then, particles are synthesized in the liquid containing raw materials 7 that additionally contains the additional component and others 8.

In this way, it is possible to obtain a powder of particles having a core/shell structure. The particle structure may be formed of various modes by changing the composition of the liquid containing raw materials continuously or intermittently. FIG. 3 shows examples of the particle structure.

(First Particle Structure)

Figure 3A:
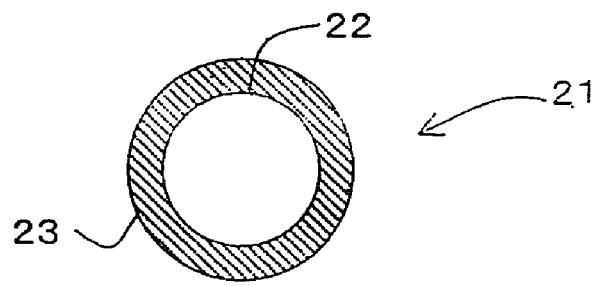
FIG. 3A shows a first particle structure, FIG. 3B, a second particle structure.

FIG. 3A shows the first particle structure 21. Particles having the first particle structure 21 are obtained by the following method (similar to the supply procedure 1 or 4 described above). A liquid containing raw materials is first made available in the liquid-preparing step (step S1). Hydrothermal synthesis is then initiated in the particle-synthesizing step (step S2). The core portion 22 of particle is formed in the hydrothermal reaction. After a particular period, another principal component different from the principal component in the liquid containing raw materials is added, and the hydrothermal reaction is continued. As a result, a shell portion 23 is formed on the core portion 22 so as to cover the shell portion. Addition of the additional component and others during hydrothermal synthesis causes intermittent change of the composition of the liquid containing raw materials, giving particles different in the composition of the principal component between the inside and the surface of particle.

(Second Particle Structure)

Figure 3B:
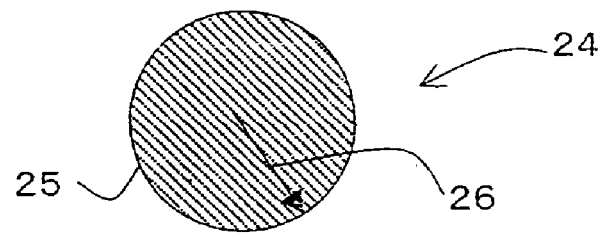
FIG. 3 is a schematic view illustrating the structures of the particles prepared in the embodiment.
FIG. 3C, a third particle structure.
FIG. 3D, a fourth particle structure.

FIG. 3B shows the second particle structure 24. The second structure is different from the first particle structure 21, in that the particle does not have a layered core/shell structure and that the composition of the particle changes continuously from inside to surface. Particles having the second particle structure 24 are obtained by the following method (similar to the supply procedure 2 or 5 described above). A liquid containing raw materials is first made available in the liquid-preparing step (step S1). Hydrothermal synthesis is then initiated in the particle-synthesizing step (step S2). An additional component is added continuously at the same time as initiation of the hydrothermal synthesis. The amount of the additional component added is increased along with time. Synthesized in such a hydrothermal synthesis are particles 25 containing the additional component in an amount lower inside the particle and gradually increasing in the direction toward the surface 26. Such addition of the additional component leads to continuous change in the composition of the liquid containing a raw material, giving particles different in the composition of the additional component between inside the particle and surface of the particle.

(Third Particle Structure)

Figure 3C:
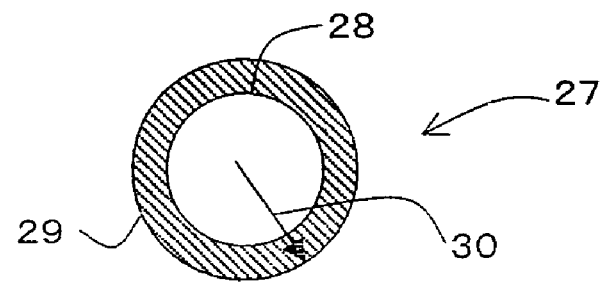

FIG. 3C shows the third particle structure 27. The third particle structure 27 is different from the first particle structure 21, in that the composition of the additional component in particle changes in the direction from the center to the surface 30 although the particle has a core/shell structure. Particles having the third particle structure 27 are obtained by the following method (similar to supply procedure 3 or 6 described above). A liquid containing raw materials is first made available in the liquid-preparing step (step S1). Hydrothermal synthesis is then initiated in the particle-synthesizing step (step S2). An additional component is added continuously at the same time as initiation of the hydrothermal synthesis. The amount of the additional component added is increased along with time. Performed in such a hydrothermal synthesis, the core portion 28 in which contained amount of the additional component is smaller in the center part and gradually increasing in the direction toward the surface 30 is formed. After an elapse of a predetermined period, a principal component different from the principal component in the liquid containing raw materials is added additionally, and the hydrothermal reaction is further continued. As a result, a shell portion 29 is formed on the core portion 28 so as to cover the core 28. The content of the additional component in the shell portion 29 increases gradually in the direction toward the surface 30. In this way, it is possible to form particles different in the composition of the principal and additional components between the inside the particle and the surface of particle (Fourth Particle Structure)

Figure 3D:
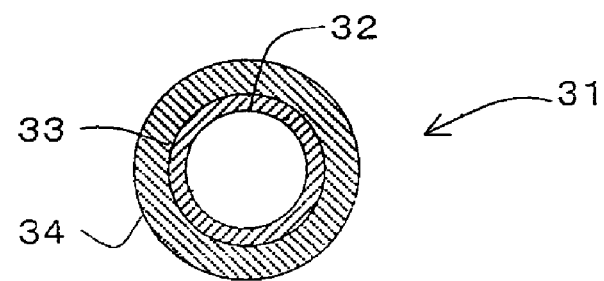

FIG. 3D shows the fourth particle structure 31. It is different from the first particle structure 21 in that it has two shell portions 33 and 34. The method of producing a powder having the fourth particle structure 31 is different from the method of producing a powder having the first particle structure 21, in that an additional principal component is added in the method of producing a powder having the first particle structure 21. Addition of other principal components multiple times during hydrothermal synthesis gives particles having multiple layers different in composition inside the particles.

An example of the powder of the particles obtained in the steps above is an oxide powder having a perovskite structure represented by $ABO_3$. For example, at least one element selected from the group consisting of barium, strontium, lead, rare-earth metals, magnesium, potassium, and sodium occupies the A site of the perovskite structure. At least one element selected from the group consisting of titanium, zirconium, and niobium occupies the B site. An oxide powder having the perovskite structure has the properties of ferroelectric material, and has a core/shell structure different in composition between the inside the particle and the surface thereof even before sintering. Thus, it is possible to sinter the powder at lower temperature and obtain a core/shell structured powder having a shell portion uniform in thickness after sintering the powder, and consequently, such a powder is favorably used for multilayered ceramic capacitors and others.

The method of producing a powder in the present embodiment may include the Heat-treating step (step S3) shown in FIG. 1. In the Heat-treating step (step S3), the hydrothermally synthesized powder obtained in the particle-synthesizing step (step S2) is heated at 1,000° C. or lower. Processing in the Heat-treating step (step S3) eliminates hydroxyl-group impurities on the surface of and inside the particles and lattice defects therein and improves the crystallinity of the particles.

The powder of an oxide having a perovskite structure represented by $ABO_3$ obtained in the steps above has the following characteristics. First, the oxide powder having a perovskite structure contains particles different in composition between the inside the particle and the surface thereof. That is, it contains particles having a core/shell structure. Next, such a powder has a weight loss rate of 0.1 wt % or more and 2.0 wt % or less when heated from 200° C. to 700° C., which is determined by thermogravimetric analysis of the oxide powder. The weight loss rate is more preferably 0.1 wt % or more and 0.5 wt % or less. When an oxide powder that is not treated in the Heat-treating step (step S3) is synthesized by the hydrothermal synthesis method, the weight of the particles decreases more because the hydroxyl groups contained in the powder are removed out of the particles as they are heated in the temperature range described above. Accordingly, when the weight loss rate determined by thermogravimetric analysis is in the range of 0.1 wt % or more and 2.0 wt % or less, the powder may be regarded as the preparation obtained by the hydrothermal synthesis method. The temperature of the thermogravimetric analysis was set to 200° C. or more, because the weight loss derived from adsorbed water is included at a temperature of 200° C. or lower. Heating up to 700° C. is aimed at ensuring elimination of the hydroxyl groups out of the particles. The thermogravimetric analyzer used was Thermo plus 2 manufactured by Rigaku Corporation, and the measurement is performed at a programmed heating rate of 10° C. per minute and at an air flow rate of 50 ml per minute.

In addition, the powder of an oxide having a perovskite structure represented by $ABO_3$ obtained in the Heat-treating step (step S3) has the following characteristics. First, the oxide powder having a perovskite structure contains particles different in composition between the inside the particle and the surface thereof. Next, when the oxide powder is synthesized by the hydrothermal synthesis method, observation of the oxide powder under a transmission electron microscope (TEM, JEM-2000 FXII, manufactured by JOEL) shows that 0.5% or more of the powder contains empty pores inside thereof. It is because hydroxyl groups contained in the powder are removed out of the particles during hydrothermal reaction and heat treatment thereof leads generation of empty pores due to barium or titanium defect. The results of observation under the transmission electron microscope indicate that a powder having a rate of the particles containing empty pores inside at 0.5% or more may be regarded as that obtained after the Heat-treating step (step S3) in the hydrothermal synthesis method.

The method of producing a multilayered ceramic capacitor having a dielectric layer formed by sintering a dielectric material containing the powder thus obtained will be described below. The multilayered ceramic capacitor may be produced, for example, according to the method for producing a laminate capacitor disclosed in Japanese Patent Application Laid-open No. 2002-80275. The invention provides a powder of an oxide having a perovskite structure represented by $ABO_3$ that is different in composition at least between the inside the particle and the surface thereof. Thus, by preparing a multilayered ceramic capacitor by using core/shell structured particles different in composition between the inside the particle and the surface even before sintering, it is possible to produce electronic parts such as multilayered ceramic capacitor having flattened temperature coefficient of capacitance.

EXAMPLES

Hereinafter, the present invention will be described in more detail with reference to Examples.

Example 1

One mole of titanium oxide powder as a raw material, 0.5 mole of barium hydroxide octahydrate, and 1 liter of ion-exchange water were placed in the reaction chamber of a hydrothermal reactor, and the mixture was allowed to react hydrothermally at 200° C. for 1 hours. After cooling, both 0.49 mole of barium hydroxide octahydrate as a principal component and 0.01 mole of yttrium acetate tetrahydrate as an additional component were added as the composition to be incorporated as components of the particles, and the mixture was allowed to react hydrothermally additionally at 200° C.

for 1 hour. The powder obtained after reaction was analyzed by using an EDX (energy dispersive X-Ray analyzer) attached to a TEM (JEM-2000 FXII, manufactured by JOEL), revealing that the core portion was composed of pure barium titanate the shell portion was composed of barium titanate containing yttrium. FIG. 3B shows the structure of the particle. A capacitor having a dielectric layer of 2.5 µm in thickness was prepared by using the powder. The lifetime of the capacitor until the resistance decreased by the order of one, as determined at 150° C. under a voltage of 10 V/µm, was 138 hours. Analysis of the temperature coefficient of capacitance of the capacitor showed that it satisfied the requirements for X7R.

Example 2

0.1 mole of titanium oxide powder as a raw material, 1 mole of sodium hydroxide as an alkaline compound, and 1 liter of ion-exchange water were placed in the reaction chamber of a hydrothermal reactor, and the mixture was heated to 200° C. After the mixture reaches to a temperature of 200° C., a principal component, aqueous barium hydroxide solution at a concentration adjusted to 0.1 mole/liter, was added therein by a metering pump as the composition to be incorporated as a component of the particles over one hour. Thirty minutes after initiating supply of the aqueous barium hydroxide solution, an additional component, aqueous yttrium acetate solution at a concentration adjusted to 0.001 mole/liter, was fed therein as the composition to be incorporated as a component of the particles by another metering pump over 30 minutes. After completion of supply of the aqueous barium hydroxide solution and aqueous yttrium acetate solution, the solution was aged at 200° C. for 1 hour. EDX analysis of the powder obtained after reaction revealed that the core portion was composed of pure barium titanate and the shell portion was composed of barium titanate containing yttrium. FIG. 3B shows the structure of the particle. A capacitor having a dielectric layer of 2.5 µm in thickness was prepared by using the powder. The lifetime described above of the capacitor was 158 hours. Analysis of the temperature coefficient of capacitance of the capacitor showed that it satisfied the requirements for X7R.

Example 3

0.1 mole of titanium oxide powder as a raw material, 1 mole of sodium hydroxide as an alkaline compound, and 1 liter of ion-exchange water were placed in the reaction chamber of a hydrothermal reactor, and the mixture was heated at 200° C. After the solution reached to a temperature of 200° C., a principal component, aqueous barium hydroxide solution at a concentration adjusted to 0.1 mole/liter, was fed therein as the composition to be incorporated as a component of the particles by a metering pump over 1 hour. Simultaneously with initiating supply of the aqueous barium hydroxide solution, an additional component, aqueous yttrium acetate solution at a concentration adjusted to 0.001 mole/liter, was added as the composition to be incorporated as a component of the particles. The supply rate of the aqueous yttrium acetate solution was 0.5 liter/hour during 20 minutes from initiation of supply, 1 liter/hour during the period from 20 to 40 minutes, and 1.5 liter/hour during the period from 40 to 60 minutes. EDX analysis of the powder obtained after reaction revealed that the concentration of yttrium gradually increased in the direction from the center to the surface of the particle. FIG. 3B shows the structure of the particle. A capacitor having a dielectric layer of 2.5 µm in thickness was prepared by using the powder. The lifetime described above of the capacitor was 121 hours. Analysis of the temperature coefficient of capacitance of the capacitor showed that it satisfied the requirements for X7R.

Comparative Example 1

One mole of titanium oxide powder as a raw material, 1 mole of barium hydroxide octahydrate, and 1 liter of ion-exchange water were placed in the reaction chamber of a hydrothermal reactor, and the mixture was allowed to react hydrothermally at 200° C. for 1 hour. EDX analysis of the powder obtained after reaction revealed that the particle is made of pure barium titanate at the center and the periphery thereof. A capacitor having a dielectric layer of 2.5 µm in thickness was prepared by using the powder. The lifetime described above of the capacitor was 87 hours. Analysis of the temperature coefficient of capacitance of the capacitor showed that it satisfied the requirements for X7R.

(Discussion on Results)

Comparison of the lifetimes of the capacitors obtained in Examples 1, 2, and 3 and Comparative Example 1 shows that the lifetime of the capacitor in each Example is longer than that in Comparative Example 1. The lifetime of the capacitor obtained in Example 2 is approximately 1.8 times longer than that in Comparative Example 1. Analysis of the temperature coefficient of capacitance of these capacitors showed that it satisfied the requirements for X7R. The results demonstrate that the method of producing a powder according to the invention provides a capacitor satisfying the requirement for X7R and having a longer lifetime.

Other Examples

In addition, the particles different in composition between the inside the particle and the surface thereof could also be obtained by the following methods.

Example 4

A principal component, aqueous lead acetate solution, was used instead of the aqueous barium hydroxide solution in Example 2 as the composition to be incorporated as a component of the particles. Other procedures are the same as those in Example 2. EDX analysis of the powder obtained after reaction revealed that the core portion was composed of pure lead titanate and the shell portion was composed of lead titanate containing yttrium. FIG. 3B shows the structure of the particle.

Example 5

One mole of titanium oxide powder as a raw material, 0.5 mole of barium hydroxide octahydrate, and 1 liter of ion-exchange water were placed in the reaction chamber of a hydrothermal reactor, and the mixture was allowed to react hydrothermally at 200° C. for 1 hour. After cooling, 0.5 mole of another principal component, strontium hydroxide octahydrate, was supplied therein as the composition to be incorporated as a component of the particles, and the mixture was allowed to react hydrothermally again at 200° C. for 1 hour. EDX analysis of the powder obtained after reaction revealed that the core portion was composed of pure barium titanate and the shell portion was composed of strontium titanate. FIG. 3A shows the structure of the particle.

(Observation of Particle Produced)

FIG. 4 shows the results obtained by observing the powder in Example 5. The dielectric powder contains barium titanate in the core portion and strontium titanate in the shell portion. FIG. 4A is a photo by obtained under a TEM (JEM-2000

Figure 4A:
FIG. 4A shows the result of TEM observation.
Figure 4B:
FIG. 4B, the result of EDX analysis of titanium elements.
Figure 4C:
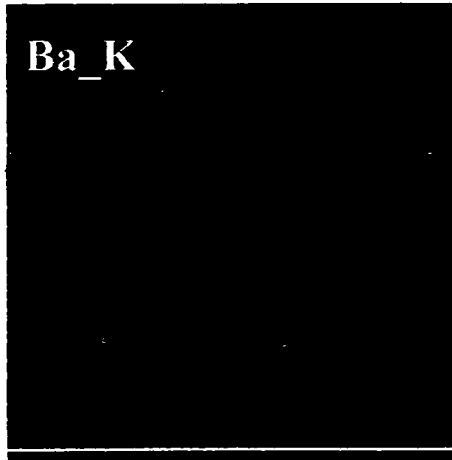
FIG. 4C, the result of EDX analysis of barium elements.
Figure 4D:
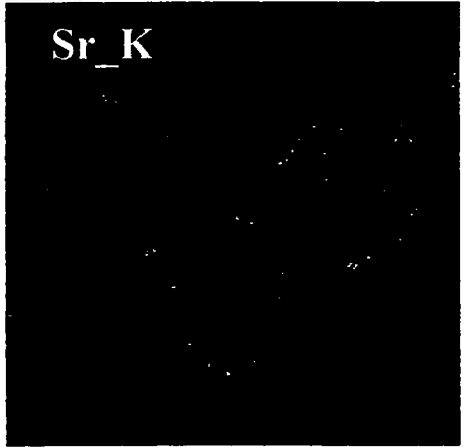
FIG. 4D, the result of EDX analysis of strontium elements.

FXII, manufactured by JOEL). The particle was analyzed in an EDX (energy dispersive X-Ray analyzer). Hereinafter, each analysis was made by using its Kline. FIG. 4B shows the result of analyzing distribution of titanium elements. As apparent when the images in FIG. 4A and 4B are seen as superimposed, titanium elements are dispersed uniformly in the particle. FIG. 4C shows the result of analyzing distribution of barium elements. As apparent when the images in FIG. 4A and 4C are seen as superimposed, barium elements are distributed mainly within approximately 80% of the central region of the particle in the diameter of the particle, forming the core region. FIG. 4D shows the result of analyzing distribution of strontium elements. As apparent when the images in FIG. 4A and 4D are seen as superimposed, strontium elements are distributed in the surface region of the particle, forming a shell portion. Thus, the powder obtained in Example 5 contains particles having the core/shell structure having a uniform shell portion thickness even before sintering.

The weight loss of the powder obtained in Example 5 during thermogravimetric analysis at 200 to 700° C. was 0.59%. The thermogravimetric analysis was performed in the analyzer under the condition described above.

Example 6

A powder was obtained in a reaction similar to that in Example 1, except that yttrium acetate tetrahydrate was replaced with dysprosium chloride. The powder was comprised of the core portion made of barium titanate and the shell portion made of barium titanate containing dysprosium. A capacitor having a dielectric layer of 2.5 μm in thickness was prepared by using the powder. The lifetime described above of the capacitor was 120 hours. Analysis of the temperature coefficient of capacitance of the capacitor showed that it satisfied the requirements for X7R.

Example 7

A powder was obtained in a reaction similar to that in Example 1, except that yttrium acetate tetrahydrate was replaced with holmium chloride. The powder was comprised of the core portion made of barium titanate and the shell portion made of barium titanate containing holmium. A capacitor having a dielectric layer of 2.5 μm in thickness was prepared by using the powder. The lifetime described above of the capacitor was 113 hours. Analysis of the temperature coefficient of capacitance of the capacitor showed that it satisfied the requirements for X7R.

Example 8

An experiment was performed in a similar manner to Example 5, except that the temperature of the first and second reactions was set to 80° C. The powder obtained after reaction was found to be barium titanate in the core portion and strontium titanate in the shell portion. The weight loss of the powder, which is determined by thermogravimetric analysis at 200 to 700° C., was 1.81%.

Example 9

An experiment was performed in a similar manner to Example 5, except that the temperature of the first and second reactions was set to 350° C. The powder obtained after reaction was found to be barium titanate in the core portion and strontium titanate in the shell portion. The weight loss of the powder, which is determined by thermogravimetric analysis at 200 to 700° C., was 0.33%.

INDUSTRIAL APPLICABILITY

The method of producing a powder according to the invention can be applied to production of a powder for dielectric materials, coating of a particle with an other component, and others.

What is claimed is:

1. A method of producing a powder comprising synthesizing particles in a liquid comprising raw materials of two or more elements,
wherein particles different in composition at least between the inside the particle and the surface thereof are obtained by supplying a composition (1) to be incorporated as a component of the particles to the liquid so that the composition of the liquid changes continuously or intermittently during the synthetic process, wherein
the obtained particles are oxides having a perovskite structure,
the oxide having a perovskite structure is an oxide represented by $ABO_3$, A represents at least one element selected from the group A consisting of barium, strontium, lead, rare-earth metals, magnesium, potassium, and sodium, and B represents at least one element selected from the group B consisting of titanium, zirconium, and niobium,
at least a raw material comprising group-A element A1 and a raw material comprising group-B element B1 are incorporated in the liquid in advance before initiation of synthesis,
the composition (1) comprises a raw material comprising another group-A element A2 different from the A1 element, and
the raw material comprising element A1 and the raw material comprising element B1 are reacted and thereafter the composition (1) is supplied to the liquid and reacted in the synthesis process, and
the particles having a composition of $A1B1O_3$ comprising the A1 and B1 elements as the principal components inside the particle and a composition of $A2B1O_3$ comprising the A2 and B1 elements as the principal components in the surface of the particle are obtained.

2. The method of producing a powder according to claim 1, wherein the particles are synthesized by hydrothermal reaction.

3. The method of producing a powder according to claim 2, wherein the particles are synthesized in an alkaline solution at 80° C. or higher.

4. The method of producing a powder according to claim 1, wherein composition (1) is supplied continuously.

5. The method of producing a powder according to claim 1, wherein composition (1) is supplied intermittently.

6. The method of producing a powder according to claim 1, wherein composition (1) is supplied continuously and intermittently in combination.

7. The method of producing a powder according to claim 1, wherein A1 is barium, B1 is titanium, and A2 is strontium.

* * * * *